US012799892B2

(12) United States Patent
John et al.

(10) Patent No.: US 12,799,892 B2
(45) Date of Patent: Nov. 17, 2026

(54) GASEOUS FUEL ENGINE STRATEGY BIASING PORT FUEL ADMISSION ALONG FLOW STREAMLINES

(71) Applicant: Caterpillar Inc., Peoria, IL (US)

(72) Inventors: Bobby John, Peoria, IL (US); Jonathan W. Anders, Peoria, IL (US); Naga Krishna Chaitanya Kavuri, Melissa, TX (US); William J. Barnes, Rapid City, SD (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/817,651

(22) Filed: Aug. 28, 2024

(65) Prior Publication Data

US 2026/0063065 A1 Mar. 5, 2026

(51) Int. Cl.
*F02B 43/10* (2006.01)
*F02B 43/12* (2006.01)

(52) U.S. Cl.
CPC .............. *F02B 43/12* (2013.01); *F02B 43/10* (2013.01)

(58) Field of Classification Search
CPC ....... F02B 43/08; F02B 43/10; F02M 35/104; F02M 35/1045; F02M 35/108; F02M 35/1085
USPC ......... 123/184.21, 184.42–184.45, 445, 527, 123/585
See application file for complete search history.

(56) References Cited

U.S. PATENT DOCUMENTS 3,125,085 A * 3/1964 Kauffmann ........ F02M 21/0269 123/527
6,609,499 B2 * 8/2003 Kabat ................ F02M 21/0284 123/527
6,820,706 B2 11/2004 Ovshinsky et al.
7,305,958 B2 12/2007 Doko et al.
8,267,068 B1 * 9/2012 Low ..................... F02M 61/145 123/468
8,281,766 B2 * 10/2012 Tomiita .............. F02M 61/1853 701/103
8,800,530 B2 * 8/2014 Vijayaraghavan ........................... F02D 13/0257 123/308
9,217,393 B2 * 12/2015 Kim .......................... F02F 1/24
10,704,513 B2 7/2020 Morimoto
11,959,414 B2 4/2024 Shroeder et al.
(Continued)

FOREIGN PATENT DOCUMENTS

CN 207437219 U 6/2018
CN 113090426 A * 7/2021 ......... F02M 21/0206
DE 4439921 A1 * 5/1995 .............. F02B 31/00
DE 19649466 A1 * 6/1998 ............ F02B 31/085
(Continued)

*Primary Examiner* — George C Jin
*Assistant Examiner* — Teuta B Holbrook

(57) ABSTRACT

Operating a gaseous fuel engine system includes opening and closing two intake valves for each of a plurality of intake ports to fluidly connect the intake ports to cylinders in an engine via two intake valve openings. Pressurized intake air is fed through each of the intake ports so as to define flow streamlines extending to inward sides of the respective two intake valve openings. Gaseous fuel admitted to each of the plurality of intake ports is advanced into cylinders in an engine in a manner proportionally concentrated around the respective flow streamlines. When advanced into the cylinders the gaseous fuel may be biased in distribution away from cylinder walls thereof. In an embodiment the gaseous fuel includes a gaseous hydrogen fuel. Related apparatus is also disclosed.

19 Claims, 3 Drawing Sheets

(56) References Cited

U.S. PATENT DOCUMENTS

| | | | | |
|---|---|---|---|---|
| 2005/0235961 | A1* | 10/2005 | Kayama | F02M 61/145 123/470 |
| 2015/0204285 | A1 | 7/2015 | Gruschow et al. | |
| 2018/0171913 | A1* | 6/2018 | Ulrey | F02D 13/0261 |
| 2023/0417207 | A1* | 12/2023 | Zhu | F02M 55/025 |

FOREIGN PATENT DOCUMENTS

| | | | | |
|---|---|---|---|---|
| DE | 102012112847 | A1 * | 7/2013 | F02M 21/0248 |
| DE | 102021110252 | A1 | 10/2021 | |
| JP | 2760115 | B2 * | 5/1998 | |
| KR | 101509817 | B1 | 4/2015 | |
| KR | 102338586 | B1 | 12/2021 | |

* cited by examiner

GASEOUS FUEL ENGINE STRATEGY BIASING PORT FUEL ADMISSION ALONG FLOW STREAMLINES

TECHNICAL FIELD

The present disclosure relates generally to operating a gaseous fuel engine system, and more particularly to conveying gaseous fuel through an intake port to intake valve openings in a manner optimizing in-cylinder mixing.

BACKGROUND

Internal combustion engines are well-known and widely used throughout the world for many purposes including operation of drivelines in vehicles, and powering pumps, compressors, and electrical generators to name a few examples. Research and development have been increasingly directed toward the development of engine platforms operated on so-called alternative fuels in recent years. Combustion of alternative fuels is considered to produce fewer undesired emissions as compared to traditional fuels such as diesel, gasoline, and natural gas.

One alternative fuel type receiving significant interest is gaseous hydrogen fuel, as well as various fuel blends containing gaseous molecular hydrogen. Hydrogen is relatively easy to ignite and has a very rapid flame speed as compared to many hydrocarbon fuels. Since engines are traditionally designed to operate on a single fuel or relatively narrow range of fuel types, adapting engine platforms to hydrogen or hydrogen blends has created a host of new challenges ranging from combustion phasing and control to fuel handling and storage to lubrication and thermal management. With regard to ignitability, it has been observed that relatively thorough mixing of hydrogen fuel with air can provide benefits respecting predictability of ignition and avoidance of undesired forms and/or manner of combustion. Some strategies focus on optimizing fuel and air mixing in advance of admitting the fuel to a cylinder whereas others are directed more toward optimizing in-cylinder fuel and air mixing. While there has been commercial success of various of these technologies, representing some progress, many obstacles to exploiting gaseous hydrogen to its full theoretical potential as a combustion fuel nevertheless remain, and will likely be with us for some time. One known engine arrangement including a piston apparently optimized for hydrogen fuels is known from U.S. Pat. No. 11,959,414B1 to Shroeder et al.

SUMMARY

In one aspect, a method of operating an engine system includes feeding pressurized air through a manifold into a plurality of intake ports each extending to two intake valve openings in an engine, and admitting a gaseous fuel from a plurality of fuel admission tubes into streams of the pressurized air through each respective one of the plurality of intake ports. The method further includes advancing the gaseous fuel into the respective two intake valve openings in a distribution pattern biased to inward sides of the respective two intake valve openings, and feeding the gaseous fuel from each respective two intake valve openings into a cylinder in the engine for combustion.

In another aspect, a method of operating an engine system includes feeding pressurized air through a manifold fluidly connected to a plurality of intake ports in an integrated cylinder head of an engine forming both a manifold cavity and the plurality of intake ports. The method further includes opening and closing two intake valves for each of the plurality of intake ports to fluidly connect, in a serial and repeating inline filing order, each respective intake port to a cylinder in the engine via two intake valve openings. The method further includes feeding the pressurized intake air through each of the plurality of intake ports while fluidly connected to the respective cylinder so as to define flow streamlines in each respective intake port extending to inward sides of the respective two intake valve openings. The method still further includes admitting a gaseous fuel to each of the plurality of intake ports, and advancing the gaseous fuel into the plurality of cylinders in a manner proportionally concentrated along the respective flow streamlines.

In still another aspect, a gaseous fuel engine system includes an integrated cylinder head and intake manifold forming a manifold cavity fluidly connecting an intake air opening to a plurality of intake ports. The plurality of intake ports are each directly fluidly connected to the manifold cavity and extend to two intake valve openings structured to fluidly connect to a respective one of a plurality of cylinders in a cylinder block. The engine system further includes a plurality of fuel admission tubes each having a curved profile and extending through the manifold cavity to a fuel outlet located in a respective one of the plurality of intake ports. The plurality of fuel admission tubes are varied with respect to at least one of a fuel admission location or a fuel admission angle, relative to the respective two intake valve openings.

DETAILED DESCRIPTION

Figure 1:
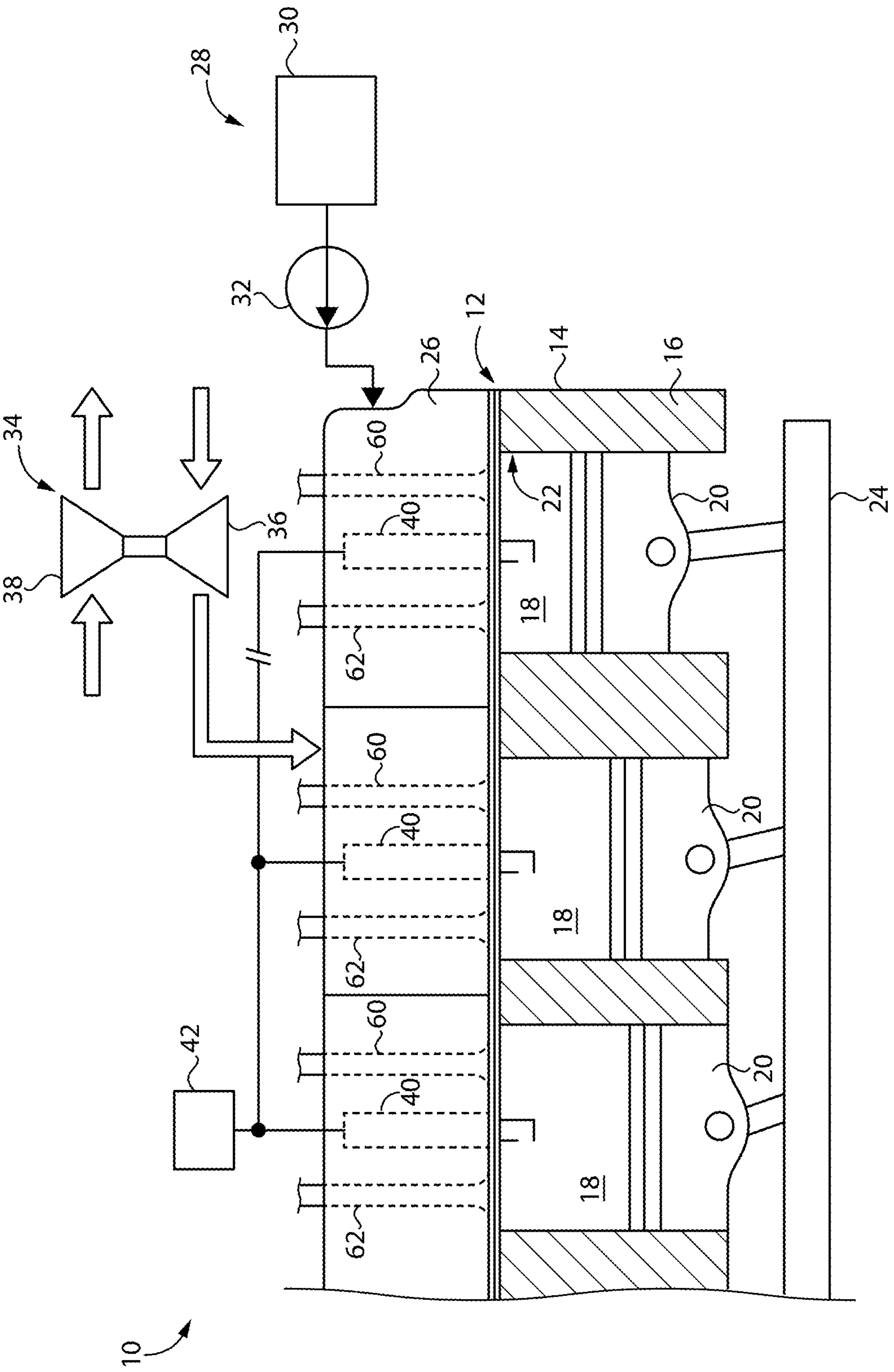
FIG. 1 is a side diagrammatic view of a gaseous fuel engine system, according to one embodiment.

Referring to FIG. 1, there is shown a gaseous fuel internal combustion engine system 10, according to one embodiment. Engine system 10 includes a gaseous fuel engine 12 having an engine housing 14. Engine housing 14 includes a cylinder block 16 having a plurality of cylinders 18 formed therein. A plurality of pistons 20 are within cylinders 18 and movable between a top-dead-center position and a bottom-dead-center position in a generally conventional manner to rotate a crankshaft 24. Engine system 10 can be applied to operate a rotatable load such as an electrical generator, a compressor, a pump, or a driveline in a land vehicle or a marine vessel to name a few examples.

Engine system 10 also includes a fuel system 28. Fuel system 28 includes a gaseous fuel supply 30, and at least one pump 32 operable to transfer and pressurize a gaseous fuel stored in fuel supply 30 to an injection pressure. In one practical implementation fuel supply 30 stores a gaseous hydrogen fuel such as gaseous molecular hydrogen. A gaseous hydrogen fuel may include substantially pure gaseous molecular hydrogen as well as various blends including, for example, gaseous molecular hydrogen blended with a gaseous hydrocarbon fuel, with gaseous molecular hydrogen typically predominating by volume. Fuel supply 30 may store the gaseous fuel in a pressurized gaseous state, a cryogenically liquefied state, or can supply gaseous fuel or constituents of a gaseous fuel blend from a pipeline or the like.

Engine 12 may be spark-ignited and includes a plurality of sparkplugs 40 each forming a spark gap within one of cylinders 18. An electronic control unit or ECU 42 is provided for energizing sparkplugs 40. Engine system 10 further includes a turbocharger 34 having a compressor 36 structured to pressurize intake air for delivery to engine 12 and a turbine 38 conventionally operated by way of a flow of exhaust gases from engine 12. Engine 12 further includes a cylinder head 26. Cylinder head 26 may include an integrated cylinder head and intake manifold (hereinafter "integrated cylinder head 26") that is structured to receive a feed of gaseous fuel from fuel system 28 and also a feed of pressurized intake air from compressor 36 for admission and combustion together in cylinders 18, as further discussed herein. A plurality of intake valves 60, typically including two intake valves per cylinder, and a plurality of exhaust valves 62, typically including two exhaust valves per cylinder, are supported in integrated cylinder head 26.

Figure 2:
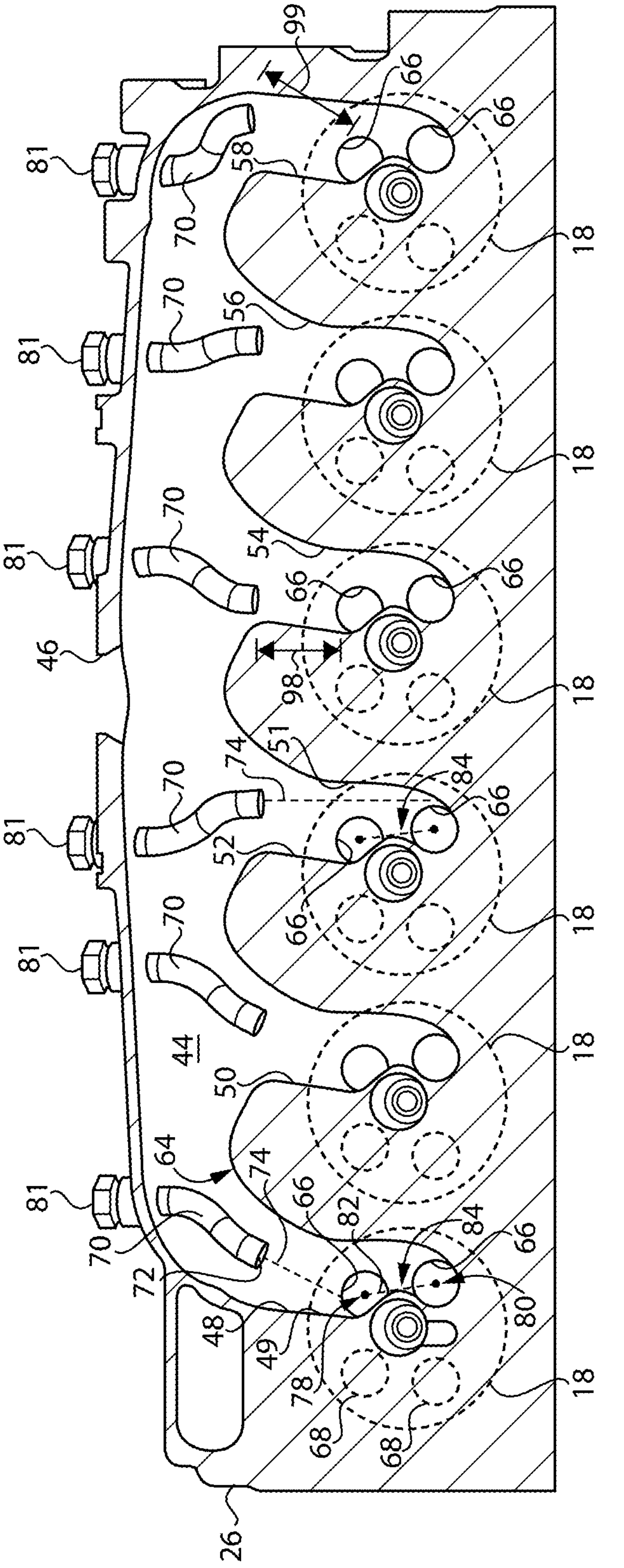
FIG. 2 is a sectioned top view of an integrated cylinder head and intake manifold, according to one embodiment.

Referring also now to FIG. 2, integrated cylinder head 26 may include a monolithic slab casting that is associated with all of the cylinders in engine 12. In other instances, individual cylinder head sections that are attached together and each associated with one or more, but less than all, cylinders might be provided. Integrated cylinder head 26 forms a manifold cavity 44 fluidly connecting an intake air opening 46 receiving the feed of pressurized intake air from compressor 36 to a plurality of intake ports 48, 50, 52, 54, 56, 58. In the illustrated embodiment cylinders 18 and intake ports 48, 50, 52, 54, 56, 58, are arranged in an inline pattern. A total of six cylinders and a total of six intake ports are provided in the illustrated embodiment of engine 12. In other instances, a different number of cylinders and intake ports might be used. As will be further apparent from the following description engine 12 is uniquely configured for admission and flow of gaseous fuel and pressurized intake air through the respective intake ports and into the respective cylinders in a manner contemplated to provide optimized in-cylinder mixing.

Intake ports 48, 50, 52, 54, 56, 58 each extend from an intake port inlet 64, shown in connection with intake port 48, directly fluidly connected to manifold cavity 44, to two intake valve openings 66. Intake valve openings 66 are structured to fluidly connect to a respective one of the plurality of cylinders 18 in cylinder block 16. Fuel system 28 also includes a plurality of fuel admission tubes 70 each supported in integrated cylinder head 26. Fuel admission tubes 70 may each have a curved profile and extend through manifold cavity 44 to a fuel outlet 72 located in a respective one of the plurality of intake ports 48, 50, 52, 54, 56, 58. Each of fuel admission tubes 70 may include a fitting 81 located outside of integrated cylinder head 26 and structured to receive a feed of gaseous fuel from the one or more pumps 32. In an embodiment, the gaseous fuel is delivered to fuel admission tubes 70 by way of fittings 81 at an injection pressure. Suitable fuel admission valves (not shown) movable between an open position and a closed position may be positioned fluidly between fittings 81 and pump 32. In other embodiments fuel admission valves could be integrated into fuel admission fittings 70. Fuel admission tubes 70 may be unobstructed from the respective fitting 81 to the respective fuel outlets 72 in some embodiments. As noted above, intake ports 48, 50 52, 54, 56, 58 are arranged in an inline pattern. As can be seen from FIG. 2 intake air opening 46 may be centrally located to the inline pattern, with three intake ports to the left and three intake ports to the right. The present disclosure is not limited in this regard, however, and other arrangements and locations of an intake air opening for feeding pressurized intake are within the scope of the present disclosure.

As illustrated with respect to fuel admission tubes 70 associated with intake port 48 and with intake port 52, each fuel admission tube 70 may define an outgoing fuel axis 74. Each intake valve opening 66 may define a valve opening axis, and it can be seen with regard to intake port 48 that an upstream intake valve opening 66 defines an upstream valve axis 78 and a downstream intake valve opening 66 defines a downstream valve opening axis 80. Upstream means in a flow direction of intake air opening 46, and downstream means in a flow direction of intake valve openings 66. Each respective two intake valve openings 66 for each respective one of intake ports 48, 50, 52, 54, 56, 58, may define a center-center line 82 connecting the respective upstream valve opening axis 78 and downstream valve opening axis 80, and having a midpoint 84. As further discussed herein, the plurality of fuel admission tubes 70 may be varied with respect to at least one of a fuel admission location or a fuel admission angle, relative to the respective two intake valve openings 66. The description of the plurality of fuel admission tubes 70 being thusly varied means that collectively fuel admission tubes 70 include, among all of them, at least two different fuel admission locations, at least two different fuel admission angles, or both, relative to the respective two intake valve openings 66.

In FIG. 2, intake port 54 illustrates a distance 98 between the respective fuel admission tube 70 and an upstream one of intake valve openings 66. Associated with intake port 58 is a slightly greater analogously defined distance 99. Thus, intake ports 54 and 58 are associated with two different fuel admission locations. Positioning the exit of a fuel admission tube relatively closer to intake valve openings can be associated with relatively less time for mixing of fuel and air in the respective intake port. In contrast, positioning the exit relative further from intake valve openings provides more opportunity for fuel-air mixing but may increase likelihood of the admitted fuel in one intake port inadvertently entering a different intake port. Such a phenomenon might occur where a fuel exit located relatively further from intake valve openings in a first intake port is positioned within flow streamlines of a second intake port that are formed when that second intake port is "breathing." The specific positioning, orientation, and fuel exit location, among other factors, of a given fuel admission tube relative to corresponding features in an intake port may thus account for the complex and dynamic, but generally repeating, patterns of flow streamline formation during operation, balancing factors relating to optimizing fuel-air mixing against risk of so-called cross-talk between and/or among the respective intake ports. In some embodiments, distances between fuel exit locations of the respective fuel admission tubes and the inner sides of the intake ports might be different for each of the plurality of intake ports in an engine. Optimized fuel exit locations and the size of the corresponding distances 98, 99, and others analogously defined, can be determined empirically or by simulation, for example.

Respecting the potential varying of fuel admission angle, it can be noted generally from FIG. 2 that an angular orientation of fuel admission tubes 70 relative to the respective two intake valve openings 66 also varies. It can further be seen that in intake port 48 fuel axis 74 extends between the respective center-center line midpoint 84 and an outside wall 49 of intake port 48. An analogous fuel angle orientation between a center-center line midpoint and an outside wall can be seen with regard to intake port 58. Intake port 52 shows fuel axis 74 extending between the respective center-center line midpoint 84 and inside wall 51. An outside wall of a given intake port according to the present description is a wall relatively further away, in a linear direction along the inline pattern, from air opening 46. An inside walls of a given intake port is a wall relatively closer, in a linear direction along the inline pattern, to air opening 46.

It can thus be appreciated that in the illustrated embodiment two of the plurality of intake ports at opposite ends of the inline pattern, intake ports 48 and 58, are associated with fuel admission tubes 70 having fuel axes extending between the respective center-center line midpoint and an outside wall, in a projection plane as depicted in FIG. 2. In two of the plurality of intake ports between the opposite ends of the inline pattern, for example intake ports 52 and 54, fuel axes may extend between the respective center-center line midpoint and an inside wall, in the projection plane.

INDUSTRIAL APPLICABILITY

Figure 3:
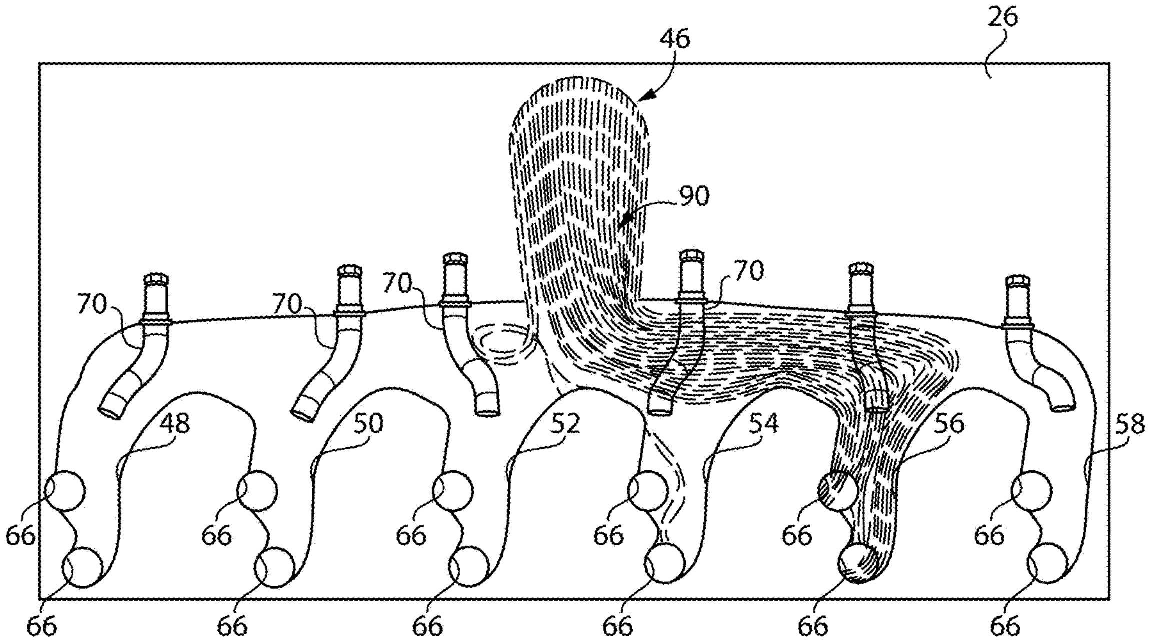
FIG. 3 is a view of an integrated cylinder head and intake manifold showing flow streamlines to an intake port, according to one embodiment.

Referring also now to FIG. 3, there is shown diagrammatically flow streamlines 90 produced in integrated cylinder head 26 when intake valve openings 66 in intake port 56 are open to the corresponding cylinder. It should be appreciated that engine system 10 is operated by opening and closing two intake valves for each of the plurality of intake ports to fluidly connect, in a serial and repeating inline firing order, each respective intake port to a cylinder in the engine via two intake valve openings. Similar flow streamlines 90 will thus be produced, engine cycle to engine cycle, within each respective intake port. The present disclosure recognizes the highly periodic but repeatable patterns of fluid flow that are produced during operation, and proposes geometry and placement of fuel admission tubes 70 in a manner that exploits the periodic and repeatable patterns of flow streamline formation.

Accordingly, during operation pressurized air is fed through manifold cavity 44 into intake ports 48, 50, 52, 54, 56, 58, one at a time, such as left to right or right to left in the FIG. 3 illustration, and gaseous fuel admitted into streams of the pressurized air conveyed through each respective one of the plurality of intake ports, for combustion in the respective cylinders. It has been discovered that optimized in-cylinder mixing can be achieved by advancing the gaseous fuel into the respective two intake valve openings 66 in a distribution pattern biased to inward sides of the respective two intake valve openings 66. Inward sides means facing sides of the two respective intake valve openings in each intake port. If each two intake valve openings 66 are considered as clock faces, the inward sides might include a downstream-facing perimeter from about 3 PM to about 9 PM for an upstream one of the respective intake valve openings, and an upstream-facing perimeter from about 9 PM to about 3 PM for a downstream one of the respective intake valve openings.

Figure 4:
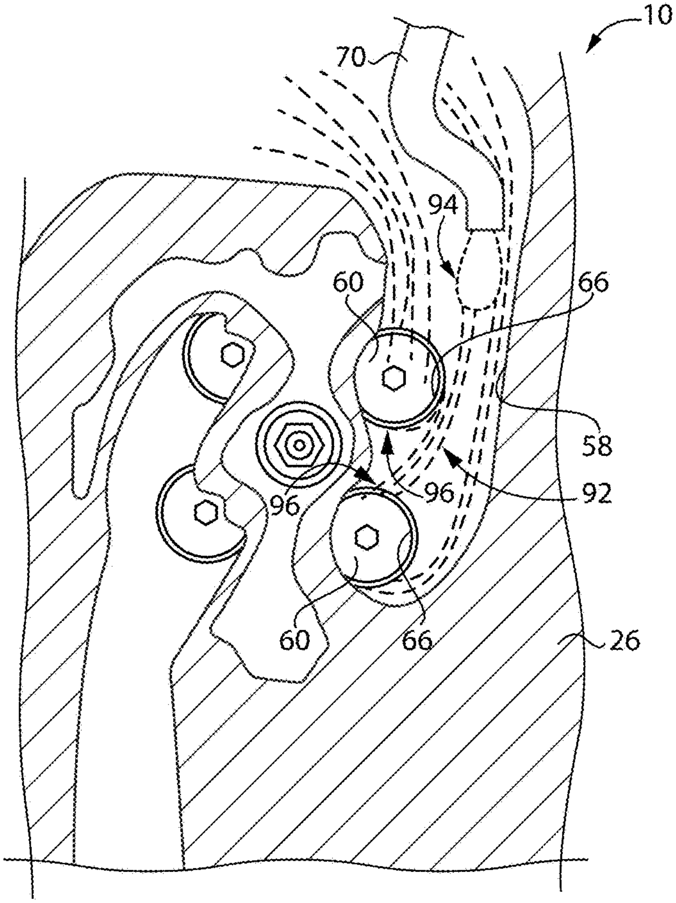
FIG. 4 is a sectioned top view of a portion of an engine system as in FIG. 1, showing fuel admission along flow streamlines, according to one embodiment.

Referring also now to FIG. 4, there can be seen a plume of admitted gaseous fuel 94 from a fuel admission tube 70. The gaseous fuel 94 is admitted while the respective two intake valve openings 66 are fluidly connected to the respective cylinder 18 so as to define flow streamlines 92 in intake port 58 that extend to inward sides 96 of intake valve openings 66. As a result, the gaseous fuel can be advanced into the respective cylinder 18 in a manner proportionally concentrated along the respective flow streamlines 92. The phenomenon can be understood as advancing at least a majority of the admitted gaseous fuel across the intake valves in a way that charges a central volume of the respective cylinder 18 with the fuel and thereby avoids contact with and flow along the cylinder walls. Looking back briefly to FIG. 1, cylinder wall 22 is shown in one of cylinders 18. The admitted gaseous fuel can form initially a pocket in the central regions of cylinder 18, providing ample and optimized contact for mixing with pressurized intake air in the cylinder. Meanwhile, other flow streamlines that do not extend to inner sides 96 of intake valve opening 66 will carry substantially only air into the respective cylinder. Once admitted to the respective cylinder the corresponding sparkplug 40 can be energized to ignite the mixed fuel and air. As will be now apparent to those skilled in the art enhanced and optimized mixing can be associated with desirable phenomena relating to ignition timing, combustion phasing control, and avoidance of undesired combustion such as knock and pre-ignition.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine system comprising:

feeding pressurized air through a manifold into a plurality of intake ports each extending to two intake valve openings in an engine;

admitting a gaseous fuel from each one of a plurality of fuel admission tubes into streams of the pressurized air through each respective one of the plurality of intake ports;

advancing the gaseous fuel admitted via each one of the plurality of fuel admission tubes into the respective two intake valve openings in a distribution pattern biased to inward sides of the respective two intake valve openings; and feeding the gaseous fuel from each respective two intake valve openings into a cylinder in the engine for combustion;

wherein the plurality of fuel admission tubes are varied with respect to at least one of a fuel outlet location or a fuel admission angle, relative to the respective two intake valve openings.

2. The method of claim 1 wherein the admitting the gaseous fuel further includes directly admitting the gaseous fuel from fuel outlets of the plurality of fuel admission tubes each located within the respective intake port.

3. The method of claim 1 wherein the manifold and the plurality of intake ports are formed in an integrated cylinder head of the engine.

4. The method of claim 3 wherein each of the two intake valve openings includes an upstream intake valve opening and a downstream intake valve opening, and the inward facing sides include a downstream facing side of the upstream intake valve opening and an upstream facing side of the downstream intake valve opening.

5. The method of claim 1 wherein each respective two intake valve openings define a center-center line having a midpoint, and the plurality of fuel admission tubes define among them at least two different distances to the respective midpoint and at least two different fuel admission angles relative to the respective center-center line.

6. The method of claim 1 wherein the advancing the gaseous fuel includes advancing the gaseous fuel through each respective intake port along flow streamlines extending to the inward sides of the respective two intake valve openings.

7. The method of claim 1 wherein the gaseous fuel includes gaseous hydrogen fuel.

8. The method of claim 1 wherein the admitting the gaseous fuel includes admitting the gaseous fuel in an inline firing order to the plurality of intake ports from a total of one fuel outlet of each respective one of the plurality of fuel admission tubes.

9. A method of operating an engine system comprising:

feeding pressurized air through a manifold fluidly connected to a plurality of intake ports in an integrated cylinder head of an engine forming both a manifold cavity and the plurality of intake ports;

opening and closing two intake valves for each of the plurality of intake ports to fluidly connect, in a serial and repeating inline firing order, each respective intake port to a cylinder in the engine via two intake valve openings;

feeding the pressurized intake air through each of the plurality of intake ports while fluidly connected to the respective cylinder so as to define flow streamlines in each respective intake port extending to inward sides of the respective two intake valve openings;

admitting a gaseous fuel to each of the plurality of intake ports via a respective one of a plurality of fuel admission tubes; and advancing the gaseous fuel into the plurality of cylinders in a manner proportionally concentrated along the respective flow streamlines, such that at least a majority of admitted gaseous fuel is advanced through each respective intake port in a distribution pattern biased to inward sides of the respective two intake valve openings so as to charge a central volume of the respective cylinder with;

wherein the plurality of fuel admission tubes are varied with respect to at least one of a fuel outlet location or a fuel admission angle, relative to the respective two intake valve openings.

10. The method of claim 9 further comprising feeding the gaseous fuel from each of the plurality of intake ports into the respective cylinder for combustion in a manner biased away from cylinder walls thereof.

11. The method of claim 10 wherein the gaseous fuel includes gaseous hydrogen fuel.

12. The method of claim 9 further comprising feeding the gaseous fuel through a plurality of fuel admission tubes each extending through the manifold cavity into a respective one of the plurality of intake ports.

13. The method of claim 12 wherein each respective two intake valve openings define a center-center line having a midpoint, and the plurality of fuel admission tubes define among them at least two different fuel admission angles relative to the respective center-center line.

14. A gaseous fuel engine system comprising:

an integrated cylinder head and intake manifold forming a manifold cavity fluidly connecting an intake air opening to a plurality of intake ports;

the plurality of intake ports are each directly fluidly connected to the manifold cavity and extend to two intake valve openings structured to fluidly connect to a respective one of a plurality of cylinders in a cylinder block;

a plurality of fuel admission tubes each having a curved profile and extending through the manifold cavity to a fuel outlet located in a respective one of the plurality of intake ports; and the plurality of fuel admission tubes are varied with respect to at least one of a fuel admission location or a fuel admission angle, relative to the respective two intake valve openings and each arranged to admit a gaseous fuel such that the admitted gaseous fuel is advanced through the respective intake port from the respective fuel admission tube in a distribution pattern biased to inward sides of the respective two intake valve openings, and each respective one of the plurality of intake ports is equipped with a total of one fuel admission tube.

15. The engine system of claim 14 wherein each respective two intake valve openings include an upstream intake valve opening and a downstream intake valve opening and define a center-center line having a midpoint.

16. The engine system of claim 15 wherein the plurality of intake ports are arranged in an inline pattern and the intake air opening is centrally located to the inline pattern.

17. The engine system of claim 16 wherein the plurality of fuel admission tubes define outgoing fuel axes including, in two of the plurality of intake ports at opposite ends of the inline pattern, fuel axes extending between the respective center-center line midpoint and outside walls of the respective intake ports.

18. The engine system of claim 17 wherein the fuel axes include, in two of the plurality of intake ports between the opposite ends of the inline pattern, fuel axes extending between the respective center-center line midpoint and inside walls of the respective intake port.

19. The engine system of claim 14 further comprising a gaseous hydrogen fuel supply fluidly connected to each of the plurality of fuel admission tubes.

* * * * *